(12) United States Patent
Pitkamaki (10) Patent No.: US 9,301,230 B2
(45) Date of Patent: Mar. 29, 2016

(54) INTER-SYSTEM HAND-OVER OF A MOBILE TERMINAL OPERABLE WITH A FIRST AND A SECOND RADIO ACCESS NETWORK

(75) Inventor: Antti Pitkamaki, Tampere (FI)

(73) Assignee: Vringo, Inc., New York, NY (US)

( * ) Notice: Subject to any disclaimer, the term of this patent is extended or adjusted under 35 U.S.C. 154(b) by 0 days.

(21) Appl. No.: 13/615,415

(22) Filed: Sep. 13, 2012

(65) Prior Publication Data
US 2013/0072190 A1 Mar. 21, 2013

Related U.S. Application Data

(63) Continuation of application No. 11/666,578, filed as application No. PCT/IB2004/003590 on Nov. 3, 2004.

(51) Int. Cl.
| | | |
|---|---|---|
| *H04W 36/14* | (2009.01) | |
| *H04W 36/28* | (2009.01) | |
| *H04W 36/22* | (2009.01) | |

(52) U.S. Cl.
CPC .............. *H04W 36/14* (2013.01); *H04W 36/22* (2013.01); *H04W 36/28* (2013.01)

(58) Field of Classification Search
CPC ................... H04W 36/0066; H04W 36/0083; H04W 36/14; H04W 92/02; H04W 28/18; H04W 72/0406; H04W 88/06; H04W 28/24; H04W 36/0094; H04W 36/12; H04W 36/24; H04W 36/26; H04W 36/30
USPC ............................. 455/435.2–435.3, 436–444
See application file for complete search history.

(56) References Cited

U.S. PATENT DOCUMENTS

| | | | | |
|---|---|---|---|---|
| 5,737,703 | A | * | 4/1998 | Byrne ............................ 455/442 |
| 6,002,933 | A | | 12/1999 | Bender et al. |
| 6,246,872 | B1 | * | 6/2001 | Lee ........................ H04W 76/02 455/414.1 |
| 6,438,114 | B1 | * | 8/2002 | Womack ............ H04W 72/0413 370/329 |

(Continued)

FOREIGN PATENT DOCUMENTS

| | | |
|---|---|---|
| CN | 1335302 A | 6/2002 |
| CN | 1455997 | 11/2003 |

(Continued)

OTHER PUBLICATIONS

3$^{rd}$ Generation Partnership Project, Technical Specification Group Core Network, Mobile radio interface layer 3 specification Core Network Protocols, Stage 3, TS24.008 v3.19.0 (Jun. 2004).

(Continued)

*Primary Examiner* — Matthew Sams
(74) *Attorney, Agent, or Firm* — Cozen O'Connor (57) ABSTRACT

A method and device for initiation a mobile originating service-based inter-system handover. At least two radio access networks (RANs) of different types, i.e. RAN of a first type and a RAN of a second type. A dual-mode mobile terminal communicates with the communication system via the RAN of the first type. The initiation of the inter-system handover is included in a transmission including a bearer capability (BC) field. The BC field indicates that a requested service is only operable with the RAN of the second type. In particular, at least one BC field is set to a parameter value, which serves as indication for the receiving network and its processing entities, respectively, which receiving network indicated to carry out the inter-system handover initiated by the mobile terminal.

10 Claims, 6 Drawing Sheets

(56) References Cited

U.S. PATENT DOCUMENTS

| | | | |
|---|---|---|---|
| 6,701,151 B2* | 3/2004 | Diachina et al. | 455/452.1 |
| 6,771,964 B1* | 8/2004 | Einola et al. | 455/437 |
| 6,891,851 B1* | 5/2005 | Demakakos | H04L 12/2697 370/249 |
| 6,904,029 B2* | 6/2005 | Fors et al. | 370/331 |
| 6,990,344 B1* | 1/2006 | Dolan | H04W 36/0094 455/436 |
| 7,065,367 B2* | 6/2006 | Michaelis | H04W 88/06 370/342 |
| 7,089,008 B1* | 8/2006 | Back | H04W 36/14 370/331 |
| 7,107,055 B2* | 9/2006 | Gallagher | H04W 60/04 455/426.1 |
| 7,123,920 B1* | 10/2006 | Faccin | H04W 76/022 370/230 |
| 7,200,401 B1* | 4/2007 | Hulkkonen | H04W 36/24 370/331 |
| 7,224,977 B2* | 5/2007 | Cavalli | H04W 36/0083 370/329 |
| 7,257,403 B2* | 8/2007 | Nikkelen | H04W 36/0066 370/331 |
| 7,295,566 B1* | 11/2007 | Chiu | H04L 12/5601 370/395.2 |
| 7,643,786 B2 | 1/2010 | Söderbacka et al. | |
| 7,769,382 B2* | 8/2010 | Rasanen | 455/436 |
| 8,428,600 B2* | 4/2013 | Ishii | H04W 36/0066 370/331 |
| 8,812,000 B2 | 8/2014 | Pitkamaki | |
| 2001/0007819 A1 | 7/2001 | Kubota | |
| 2002/0045447 A1 | 4/2002 | Rasanen | |
| 2002/0067707 A1* | 6/2002 | Morales | H04W 36/0066 370/331 |
| 2003/0114158 A1* | 6/2003 | Soderbacka et al. | 455/436 |
| 2003/0186692 A1* | 10/2003 | Tamura | H04W 76/022 455/422.1 |
| 2003/0186698 A1 | 10/2003 | Holma et al. | |
| 2004/0121778 A1* | 6/2004 | Hunkeler | H04W 28/24 455/452.2 |
| 2005/0026616 A1* | 2/2005 | Cavalli | H04W 36/0083 455/436 |
| 2005/0073977 A1* | 4/2005 | Vanghi | H04W 36/0066 370/335 |
| 2007/0237126 A1 | 10/2007 | Pirila | |
| 2013/0072190 A1* | 3/2013 | Pitkamaki | H04W 36/14 455/436 |

FOREIGN PATENT DOCUMENTS

| | | |
|---|---|---|
| CN | 1166243 | 9/2004 |
| CN | 1605222 | 4/2005 |
| EP | 1 491 063 | 8/2008 |
| FR | 2854295 | 10/2004 |
| JP | 2002-535941 | 10/2002 |
| WO | WO 00/27051 | 5/2000 |
| WO | WO 00/27057 | 5/2000 |
| WO | WO 0027051 | 5/2000 |
| WO | WO0027051 A2 * | 5/2000 |
| WO | WO 00/44189 | 7/2000 |
| WO | WO 0044189 | 7/2000 |
| WO | WO 01/31963 | 5/2001 |
| WO | WO 03/053091 | 6/2003 |
| WO | WO 2004/056150 | 7/2004 |
| WO | WO 2006/048697 | 5/2006 |

OTHER PUBLICATIONS

3GPP TR 23.903 V1.0.0., (Sep. 2004) 3$^{rd}$ Generation Partnership Project; Technical Specification Group Serivces and System Aspects; Redial solution for Voice-Video Switching; Release 6, 2004, (35 pages).

"3GPP TS 27.001 V4.12.0 (Jun. 2004) 3rd Generation Partnership Project; Technical Specification Group Core Network; General on Terminal Adaption Functions (TAF) for Mobile Stations (MS) (Release 4)", Jun. 18, 2004, 11 pages.

Alcatel "3GPP TSG-SA2#33, Tdoc S2-032574, New procedure for dual CN connection, 9 Technical Enhancements/23.060", Jul. 7-11, 2003, 7 pages.

"3GPP TSG-SA WG2: Tdoc S2-042617", Meeting #41, Montreal, Canada, Aug. 16-20, 2004, 10 pages.

"3GPP TSG-SA WG2: Tdoc S2-042618", Meeting #41, Montreal, Canada, Aug. 16-20, 2004, 4 pages.

"3GPP TS 24.008 V5.12.0 Technical Report", (Jun. 2004), 32 pages.
"3GPP TS 24.008 V4.14.0 Technical Report", (Jun. 2004), 2 pages.
"3GPP TS 24.008 V5.12.0 Technical Report", (Jun. 2004), 26 pages.
"Invalidation Request", Sep. 18, 2015, 72 pages.
"Supplemental Reasons for Invalidation Request", Oct. 19, 2015, 45 pages.

Search Report Feb. 28, 2007 which issued in the corresponding Pakistani Patent Application No. 783/2005, 2 pages.

Notice of Reasons for Rejection dated Oct. 20, 2009 which issued in the corresponding Japanese Patent Application No. 2007-539641, 5 pages.

Notice of Reasons for Rejection dated May 25, 2010 which issued in the corresponding Japanese Patent Application No. 2007-539641, 4 pages.

Office Action dated Apr. 30, 2008 which issued in the corresponding Korean Patent Application No. 10-2007-7010154, 8 pages.

Office Action dated Nov. 25, 2008 which issued in the corresponding Korean Patent Application No. 10-2007-7010154, 8 pages.

Office Action dated Aug. 30, 2012 which issued in the corresponding Taiwanese Patent Application No. 094137753, 3 pages.

Office Action dated Nov. 17, 2011 which issued in the corresponding Taiwanese Patent Application No. 094137753, 9 pages.

* cited by examiner

| 8 | 7 | 6 | 5 | 4 | 3 | 2 | 1 | |
|---|---|---|---|---|---|---|---|---|
| \multicolumn{8}{|c|}{Bearer capability IEI} | octet 1 |
| | | | | | | | | |

| 8 | 7 | 6 | 5 | 4 | 3 | 2 | 1 | |
|---|---|---|---|---|---|---|---|---|
| Bearer capability IEI | | | | | | | | octet 1 |
| Length of the bearer capability contents | | | | | | | | octet 2 |
| 0/1 ext | radio channel requirement | | coding std | transfer mode | information transfer capability | | | octet 3 |
| 0/1 ext | 0 coding | CTM | 0 spare | speech version indication | | | | octet 3a* |
| 0/1 ext | 0 coding | 0 spare | 0 spare | speech version indication | | | | octet 3b etc* |
| 1 ext | comp -ress. | structure | | dupl. mode | confi gur. | NIRR | esta- bli. | octet 4* |
| 0/1 ext | 0 access id. | 0 | rate adaption | | signalling access protocol | | | octet 5* |
| 0/1 ext | Other ITC | | Other rate adaption | | 0 | 0 Spare | 0 | octet 5a* |
| 1 ext | Hdr/ noHdr | Multi frame | Mode | LLI | Assig nor/e | Inb. neg | 0 Spare | octet 5b* |
| 0/1 ext | 0 layer 1 id. | 1 | User information layer 1 protocol | | | | sync/ async | octet 6* |
| 0/1 ext | numb. stop bits | nego- tia- tion | numb. data bits | user rate | | | | octet 6a* |
| 0/1 ext | intermed. rate | | NIC on TX | NIC on RX | Parity | | | octet 6b* |
| 0/1 ext | connection element | | modem type | | | | | octet 6c* |
| 0/1 ext | Other modem type | | Fixed network user rate | | | | | octet 6d* |
| 0/1 ext | Acceptable channel codings | | | Maximum number of traffic channels | | | | octet 6e* |
| 0/1 ext | UIMI | | | Wanted air interface user rate | | | | octet 6f* |
| 1 ext | Acceptable channel codings extended | | | Asymmetry Indication | | 0 Spare | 0 | octet 6g* |
| 1 ext | 1 layer 2 id. | 0 | User information layer 2 protocol | | | | | octet 7* |

INTER-SYSTEM HAND-OVER OF A MOBILE TERMINAL OPERABLE WITH A FIRST AND A SECOND RADIO ACCESS NETWORK

CROSS REFERENCE TO RELATED APPLICATIONS

This application is a continuation of U.S. patent application Ser. No. 11/666,578 which was filed with the U.S. Patent and Trademark Office on Jun. 2, 2008 which is a U.S. national stage of application No. PCT/IB04/03590, filed on Nov. 3, 2004.

BACKGROUND OF THE INVENTION

1. Field of the Invention

The present invention relates to an inter-system handover between a first radio access network and a second radio access network. Particularly, the invention relates to a terminal-oriented handover having improved characteristics.

The present invention relates to a method of performing an inter-system handover of a mobile terminal accessing a communication network via a radio access network (RAN) of a first type. Particularly, the communication network comprises radio access networks (RAN) of this first type and one or more radio access networks of second types. The invention equally relates to a corresponding mobile terminal, to a corresponding communication network, to a corresponding communication system and to network elements of the communication network.

2. Description of the Related Art

It is known from the state of the art in a communication system providing different radio access technologies (RAT) to support an inter-system handover of a mobile terminal between these technologies. Such a handover may be performed for instance between a 3 G (3rd generation) radio access network and a 2 G (2nd generation) radio access network, or within a 3 G system between a UTRAN (universal mobile telecommunication services terrestrial radio access network) employing WCDMA (wideband code division multiple access) and a GSM (global system for mobile communications) radio access network (RAN). As a prerequisite for an inter-system handover, the mobile terminal in question is operable with the communication system via all concerned types of radio access networks (RANs). Such mobile terminals are referred to as multi-mode terminals. One example of a multi-mode terminal is a dual-mode terminal which is operable in 2 G and 3 G networks.

The network signalling employed for performing an inter-system handover between UMTS Universal Mobile Telecommunication Services) and GSM is described for example in the technical specification 3GPP TS 23.009 V3.14.0 (2003/06): "Handover procedures" (Release 1999)".

There are several reasons for which a change, i.e. an inter-system handover, of the radio access technology is enabled.

The most important reason for an inter-system handover is differences of coverage and connection/service quality in the communication system. In some situations, a mobile terminal may move out of the coverage area of the first radio access system. Moreover, the radio connection quality provided by this first radio access system may degrade below a given threshold value. If at the same time, another radio access system still provides coverage and or a better radio connection quality, an inter-system handover can guarantee a continued and satisfactory supply of the mobile terminal. The first radio access system is typically a GSM/GPRS system and the second radio access system a WCDMA system.

Another essential reason for an inter-system handover is load, i.e. the current amount of traffic in different radio access systems. When the load in a first radio access system exceeds a pre-defined threshold value, an overflow of mobile terminals can be handed over to another radio access system. In this case, the first radio access system is typically GSM/GPRS and the second radio access system WCDMA.

A third reason for an inter-system handover is QoS (Quality of Service) requirements of requested services. The operator of the communication system defines service based handover criteria according to its preferences. These criteria are then stored in a service priority table in the core network, which initiates the handover. The same table resides additionally in the Radio Network Controller (RNC) of an UTRAN of the communication system. The table in the RNC can be used in case the RNC receives no handover information from the core network. In an exemplary assignment of services to different radio access technologies, GSM may be preferred for speech and WCDMA for packet data, while circuit switched data has to be transmitted using WCDMA. An additional criterion for a service-based handover is load, load and service based handover thus being a more accurate term than service-based handover.

As specified for example in the technical specification 3GPP TS 25.413 V3.4.0 (2000-12): 'UTRAN Iu Interface RANAP Signalling (Release 1999)", a service based handover from a 3 G UTRAN to a 2 G GSM radio access network is implemented by an optional parameter called "Service Handover" in the RANAP (radio access network application part) messages "RAB Assignment Request" and "Relocation Request" on the Iu interface between the core network and an UTRAN. Three values are defined for this parameter, "HO to GSM should be performed", "HO to GSM should not be performed" and "HO to GSM shall not be performed". Thus, the core network is not able to force the RNC to carry out a handover from a 3 G to a 2 G radio access network, but only to propose a handover. The final decision is taken by the RNC based on additional criteria like load, coverage and radio connection quality. Furthermore, in load and service based handovers, an RNC hands mobile terminals over to a base station subsystem (BSS) periodically and in groups, not immediately and on an individual basis.

All known inter-system handovers are decided by the network, which prevents a communication system to make use of possible advantages of an inter-system handover in several situations.

The current 3GPP specifications treat UTRAN, GSM and GERAN radio access cells equally, i.e. there are no strong means for the network operator or the user to guide a mobile terminal towards the most suitable radio access technology. It is known to favour one or another public land mobile network (PLMN), location area (LA), routing area (RA) or cell based on defined criteria. However, cells of different radio access technologies may be mixed in a single PLMN, LA or RA, and no method has been proposed so far for forcing the mobile terminal to a specific radio access technology, and not even for favouring a certain radio access technology. Only if a requested service cannot be provided in the current serving cell, the cell may be handed over to another cell by the network, or the cell may be cleared.

SUMMARY OF THE INVENTION

An aspect of the invention resides in a method to enable a mobile terminal in a communication system to initiate a service-based, Mobile Originating (MO) inter-system handover to a required type of radio access network during service establishment.

The envisaged solution in accordance with the present invention and its concept provides a terminal originating service-based inter-system handover, which does not require any additional communications, signalling or the like in comparison with existing communications and signaling, respectively, beyond those which are likewise performed. Beneath the lack of additional communications, the solution implies that mobile terminals are still operable within the communication network although those do not support the Mobile Originating (MO) service-based inter-system handover, which lack of functionality merely results in a conventional operation of those mobile terminals. This means, interoperability with mobile terminals lacking support and network entities or components lacking support is not compromised.

According to a first aspect of the present invention, a method of initiation a inter-system handover is provided. The hand-over preferably is service-based and the initiation to perform the inter-system handover may originate from the mobile station, i.e. mobile originating inter-system handover. A communication network comprises at least two Radio Access Networks (RANs) of different types, i.e. a Radio Access Network (RAN) of a first type and a Radio Access Network (RAN) of a second type. A mobile terminal designed to be operable with the RANs of the communication network communicates therewith via the RAN of the first type. The initiation of the inter-system handover is included in a transmission, the setup of which comprises at least one Bearer Capability (BC) field. The Bearer Capability (BC) field is set to indicate that a requested service is only operable with the RAN of the second type. In particular, at least one bearer capability (BC) field is set to a parameter value, which serves as an indication for the receiving network and its processing entities, respectively, which receiving network is indicated as the target for the inter-system handover initiated by the mobile terminal.

The inter-system handover of the present invention may be initiated by the mobile terminal because of a lacking support of the mobile terminal for the requested service in co-operation with the radio access network of the first type. This means, the radio access network of the first type may or may not support the requested service. Only the capability of the mobile terminal, whether it is able to use the requested service in co-operation with the radio access network of the first type or not is decisive. In accordance with the first aspect, the mobile terminal is not capable to operate the requested service with the radio access network of the first type, which may or may not support the service. The total capabilities of the radio access network of the first type are not crucial.

According to an embodiment of the present invention, the transmission including the initiation by the means of at least one BC field is a transmission in accordance with a cell control (CC) level procedure and in particular in accordance with a multimedia telephony cell establishment procedure. The multimedia telephony cell should comprise at least video telephony call.

According to another embodiment of the present invention, the transmission is a call control (CC) message. The call control message is sent from the mobile terminal to the core network of the first type using currently used RAN, and in particular to a call control (CC) entity of the core network of the first type. More particularly, the transmission is a standard transmission in accordance with the call control (CC) protocol, which is applied to establish a call between the mobile terminal and a calling entity or called entity. The calling or called entity may be any entity inside or outside the communication system such as another mobile terminal accessing the same or another communication system, a network terminal connected by wire or wireless to the communication system, a terminal of a public switched telephone network and the like. Preferably the message/information is then forwarded to the core network of the RAN of the second type, in particular to a mobile services switching center (MSC) of the core network of the second type.

According to yet another embodiment of the present invention, at least one Bearer Capability (BC) field has an inapplicable value in view of the radio access network of the first type; i.e. a value, which is inapplicable for being used in setting up a connection in RAN of the first type.

According to a further embodiment of the present invention, at least one Bearer Capability (BC) field selected from the plurality of Bearer Capability (BC) fields is distinguished in that at least one parameter value validity of the at least one Bearer Capability field differs in communications with the RANs of the first type and the second type. This means, the RANs of the first type and the second type expect value, values or set of values, which differ depending on the type of RAN. This means also, that at least one bearer capability (BC) field is applicable with one of the types of RAN and not applicable with the other one.

According to yet a further embodiment of the present invention, the transmission is a call control (CC) SETUP message in accordance with a mobile originating (MO) call establishment procedure. A call control entity of the mobile terminal encodes the SETUP message with one or more Bearer Capability Information Elements (BC IEs), which includes at least one bearer capability (BC) field. Then the mobile terminal transmits the SETUP message to a call control entity of the RAN of the first type to initiate the inter-system handover and after completion of handover, to set up a connection. The inter-system handover is carried out by the receiving network According to an additional embodiment of the present invention, the transmission is a call control (CC) CALL CONFIRMED message in accordance with a Mobile Terminating (MT) call establishment procedure. A call control entity of the mobile terminal encodes the CALL CONFIRMED message with one or more Bearer Capability Information Elements (BC IEs), which includes the at least one Bearer Capability (BC) field. The mobile terminal transmits the CALL CONFIRMED message via a radio frequency interface and a wireless communication connection to a call control entity of the radio access network of the first type to initiate the inter-system handover and then proceed with the call setup. The inter-system handover is carried out by the receiving network.

According to yet an additional embodiment of the present invention, none of the Bearer Capability (BC) Information Elements (B) includes a channel codings field, the value of which is not set to "not acceptable" in order to indicate to the receiving network the need for inter-system handover.

The receiving end of the SETUP message and the CALL CONFIRMED message, respectively, i.e. the call control (CC) entity of the message receiving network, analyses the received message and detects the inapplicable value of the bearer capability (BC) fields selected for indication of the inter-system handover.

According to one more embodiment of the present invention, the radio access network of the first type and the radio access network of the second type differ in communication technologies employed for realisation thereof. In particular, the radio access network of the first type is a 2nd generation technology radio access network. The radio access network of the second type is a 3rd generation technology radio access network. More particularly, the radio access network of the first type is a GSM/GPRS (Global System for Mobile communications/General Packet Radio System) RAN and the radio access network of the second type is a WCDMA (Wideband Code Division Multiple Access) RAN such as UMTS (Universal Mobile Telecommunication System).

According to a second aspect of the present invention, a computer program product is provided, which comprises program code sections preferably downloadable from any communication network for carrying out the steps of the method according to any aforementioned embodiment of the invention, when the computer program product is run on a processor-based device, a computer, a terminal, a network device, a mobile terminal, or a mobile communication enabled terminal.

According to a third aspect of the present invention, a computer program product is provided, comprising program code sections stored on a machine-readable medium for carrying out the steps of the aforementioned method according to an embodiment of the present invention, when the computer program product is run on a processor-based device, a computer, a terminal, a network device, a mobile terminal, or a mobile communication enabled terminal.

According to a fourth aspect of the present invention, a software tool is provided. The software tool comprises program portions for carrying out the operations of the aforementioned methods when the software tool is implemented in a computer program and/or executed.

According to a fifth aspect of the present invention, a computer data signal embodied in a carrier wave and representing instructions is provided which when executed by a processor causes the steps of the method according to an aforementioned embodiment of the invention to be carried out.

According to a sixth aspect of the present invention, a mobile terminal or a module enabled for initiation a mobile originating service-based inter-system handover within a communication network is provided. The mobile terminal or module is operable with the communication network, which is formed of at least a core network, a radio access network of a first type and a radio access network of a second type and the mobile terminal accesses the communication network via the radio access network of the first type. A transmission, which includes at least one bearer capability field and is transmitted from the mobile terminal to the core network via radio access network of the first type, includes the initiation of the inter-system handover. The transmission serves to indicate that a service requested by the mobile terminal is only operable with the radio access network of the second type such that the inter-system handover is required for employing the requested service.

According to one more embodiment of the present invention, the transmission, which includes the initiation, is a transmission in accordance with a call control level procedure. In particular the transmission is a transmission in accordance with a multimedia telephony call establishment procedure.

According to one more embodiment of the present invention, the mobile terminal comprises a call control entity and a radio frequency interface for communication with the communication network. The call control entity is adapted to encode the transmission and the radio frequency interface is adapted to transmit the transmission to a call control entity of the radio access network of the first type, which is accessed by the mobile terminal According to a seventh aspect of the present invention, a network entity enabled for triggering a mobile originating service-based inter-system handover within a communication network is provided. The network entity is part of the communication network, which comprises at least a core network and a radio access network of a first type and a radio access network of a second type. A transmission is received from a mobile terminal, which is operable with the radio access networks of the communication network and the transmission of the mobile terminal, which accesses the communication network via the radio access network of the first type, includes at least one bearer capability field, which indicates that a service requested by the mobile terminal is only operable with the radio access network of the second type such that the inter-system handover of the mobile terminal to the radio access network of the second type for access by the mobile terminal is triggered.

According to one more embodiment of the present invention, the transmission including the initiation is a transmission in accordance with a call control level procedure. In particular the transmission is in accordance with a multimedia telephony call establishment procedure.

According to one more embodiment of the present invention, the network entity comprises an interface, a call control entity and a triggering entity. The interface is adapted to receive the transmission. The call control entity is adapted to decode and analyse the transmission in order to detect the indication for the inter-system handover encoded in the transmission. The triggering entity is adapted to trigger the detected inter-system handover.

According to an eight aspect of the present invention, communication network enabled for performing a mobile originating service-based inter-system handover is provided. The communication network comprises radio access networks of at least a first and a second type and a network entity for performing the inter-system handover of a mobile terminal, which is operable with the communication network. The inter-system handover is performed upon a transmission of the mobile terminal, which accesses the communication network via the radio access network of the first type. The transmission includes at least one bearer capability field, which indicates that a service requested by the mobile terminal is only operable in the radio access network of the second type.

According to one more embodiment of the present invention, the transmission including the initiation is a transmission in accordance with a call control level procedure. In particular the transmission is a transmission in accordance with a multimedia telephony call establishment procedure.

According to one more embodiment of the present invention, the communication network comprises a radio frequency interface, a call control entity and a triggering entity. The radio frequency interface is adapted to receive the transmission from the mobile terminal. The call control entity is adapted to decode and analyse the transmission in order to detect the indication for the inter-system handover. The triggering entity, which is adapted to trigger the inter-system handover, triggers the inter-system handover upon detection by the call control entity. Other objects and features of the present invention will become apparent from the following detailed description considered in conjunction with the accompanying drawings. It is to be understood, however, that the drawings are designed solely for purposes of illustration and not as a definition of the scope of the invention, for which reference should be made to the appended claims. It should be further understood that the drawings are not drawn to scale and that they are merely intended to conceptually illustrate the structure and procedures described therein.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

An inter-system change from UMTS to GSM or GSM to UMTS takes place when a mobile terminal supporting both UMTS and GSM changes the radio access technology. A detailed description of call establishment procedures is given in the technical specification 3GPP TS 24.008 V3.19.0 (2004-06): "3rd Generation Partnership Project; Technical Specification Group Core Network; Mobile radio interface layer 3 specification; Core Network Protocols; Stage 3 (Release 1999)", which is enclosed and incorporated herewith.

Figure 1A:
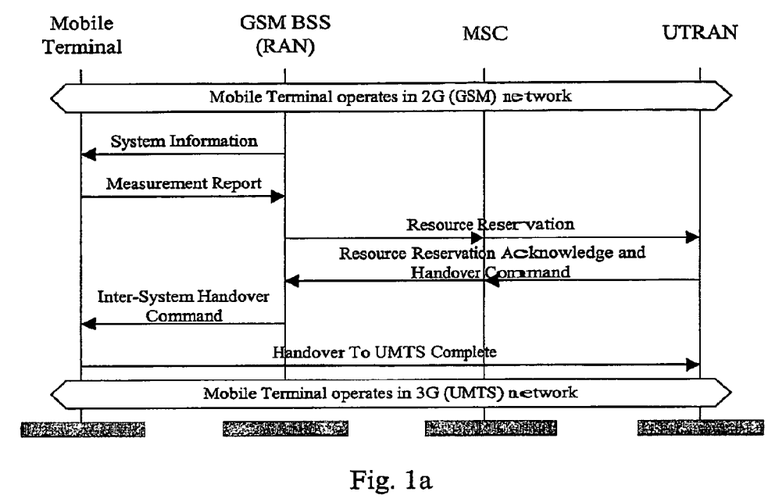
FIG. 1a shows a schematic flow chart of an inter-system handover from a 2.sup.nd generation technology communication system to a 3.sup.rd generation technology communication system

FIG. 1a shows a schematic flow chart of an inter-system handover of a dual-mode mobile terminal from a GSM access network to a UMTS access network. The mobile terminal, the base station (BS) or the UMTS radio access network (UTRAN) decides to perform an inter-system change, which makes the mobile terminal to switch to a new cell that supports UMTS radio technology and stops transmission with the previously operated network, here the GSM radio access network (RAN). Typically but not necessarily, the decision for an inter-system handover is based on a measurement report relating quantities such as signal strength, signal quality, service quality, cell coverage, network data rate load etc. Also typically, the core network of the radio access network in which the mobile terminal currently operates initiates the inter-system handover including requesting the radio access network addressed by the intended inter-system handover to reserve of resources for the mobile terminal. The request is acknowledged such that the inter-system handover can be completed by instructing the mobile terminal to handover to the addressed radio access network. With reference to FIG. 1a, the core network of the GSM based network requests the handover to the core network of the UMTS based network, which acknowledges the handover after successful resource reservation. Finally, the mobile terminal is instructed by the core network of the GSM based network to handover.

Figure 1B:
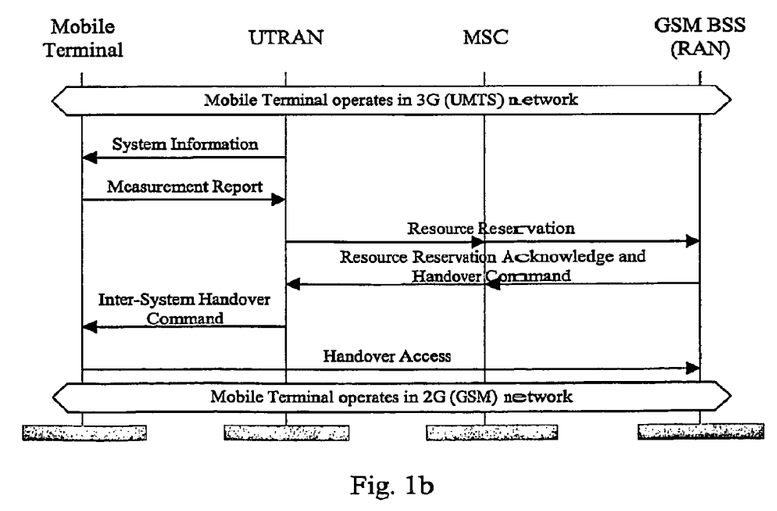
FIG. 1b shows a schematic flow chart of an inter-system handover from a 3.sup.rd generation technology communication system to a 2.sup.nd generation technology communication system.

FIG. 1b shows a schematic flow chart of an inter-system handover of a dual-mode mobile terminal from a UMTS access network to a GSM access network. The mobile terminal or base station system (BSS) or UTRAN decides to perform an inter-system change, which makes the mobile terminal switch to a new cell that supports GSM radio technology, and stops transmission to the network, i.e. to a new cell that supports UMTS radio technology. The principles explained with reference to FIG. 1a apply hereto likewise. The core network of the UMTS based network requests the handover to the core network of the GSM based network, which acknowledges the handover after successful resource reservation. Finally, the mobile terminal is instructed by the core network of the UMTS based network to It is to be noted that the term handover is meant to include as well cell reselections.

It should be noted that teaching of inter-system handover procedures is described briefly and not comprehensively. The detailed performing of a inter-system handover is out of the scope of the present invention and merely included into the description for illustrative purposes. Refer to the cited technical specification for detailed teaching.

Typical call establishment procedures will be described in the following with reference to FIGS. 2a and 2b. Basically, two different kinds of calls are distinguished in the field of mobile communications, the mobile originating or mobile originated call and the mobile terminating or mobile terminated call. The term mobile originating call indicates a call initiated by the mobile terminal, whereas the term mobile terminating call indicates a call initiated by the network and by a calling entity connected to the network, respectively. Establishing procedures of both kinds will be illustrated exemplary below. A detailed description of call establishment procedures is given in the technical specification 3GPP TS 24.008 V3.19.0 (2004-06): "Technical Specification Group Core Network; Mobile radio interface layer 3 specification; Core Network Protocols; Stage 3 (Release 1999)", which should be enclosed herewith.

Figure 2A:
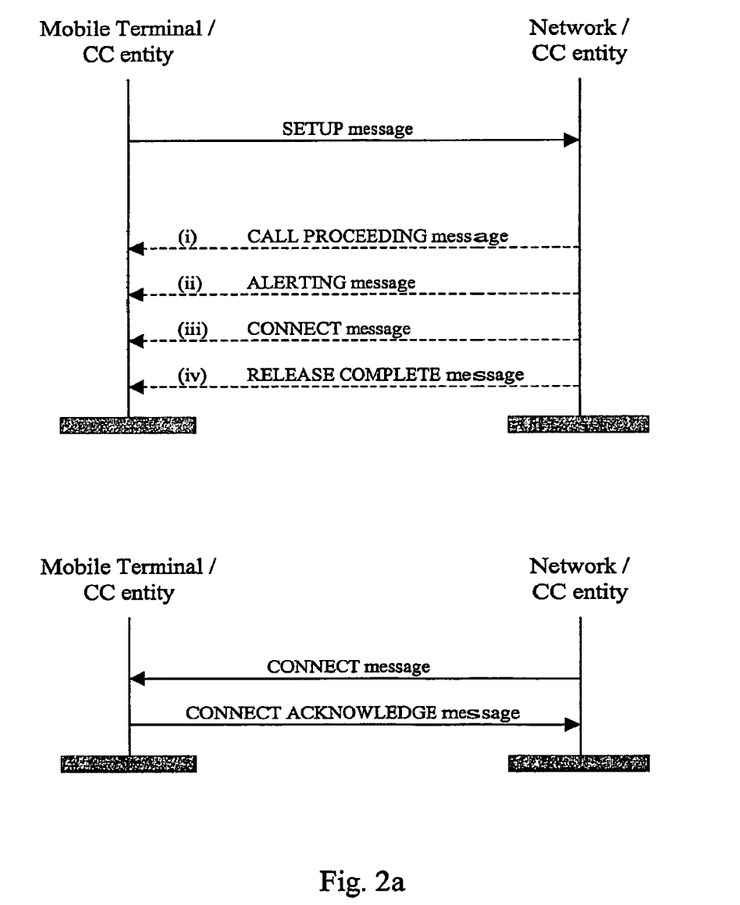
FIG. 2a shows a schematic sequence chart of a mobile originating call establishment procedure.

With reference to FIG. 2a, a mobile originating (MO) call establishment procedure is illustrated. A call control (CC) entity of the mobile terminal initiates a call control connection by requesting the mobility management (MM) sublayer to establish a mobile originating MM connection and entering the "MM connection pending" state. In principle two kinds of mobile originating calls are distinguished: basic call and emergency call. The kind of call is coded as a parameter in the request to establish an MM connection. The following description will address the basic call. Having entered the "MM connection pending" state, upon MM connection establishment, the call control entity of the mobile terminal sends a setup message to its peer entity of the network. In case of a basic call, this setup message is a designated as SETUP message. Upon transmitting the SETUP message, the call control entity enters the "call initiated" state. The SETUP message includes all information required by the network to process the call. In particular, the SETUP message includes the called party address information and one or more bearer capability information elements (BC IE). The one or more bearer capability information elements are illustrated below with reference to FIG. 3.

The "call initiated" state is supervised by a first timer (T303), which is already started before entering the "MM connection pending" state. During "call initiated" state, the further proceeding of the call establishment procedure depends on the kind of response received from the network by the call control (CC) entity of the mobile terminal. Typically the possible responses comprise a CALL PROCEEDING message, a CONNECT message and a RELEASE COMPLETE message. Upon receipt of the SETUP message, the call control entity of the network enters the "call initiated" state. In this state, the call information included in the SETUP message is analysed. Based on the call information included in the SETUP message, the call control entity of the network may determine that the received call information from the mobile terminal is invalid. Then the call control entity of the network can initiate a call clearing procedure with one of the following cause values: "unassigned (unallocated) number"; "no route to destination"; "number changed"; and "invalid number format (incomplete number)". Likewise, the call control entity of the network may determine that a requested service is not authorized or is not available. Then the call control entity of the network should initiate a call clearing procedure with one of the following cause values: "operator determined barring"; "bearer capability not authorized"; "bearer capability not presently available"; "service or option not available, unspecified"; or "bearer service not implemented".

Otherwise, i.e. the call information is valid, the control entity of the network is enabled to either: [0057] send a CALL PROCEEDING message to its peer entity (call control entity of the mobile terminal) to indicate that the call is being processed; (the call control entity of the network enters the "mobile originating call proceeding" state); [0058] send an ALERTING message to its peer entity to indicate that alerting has been started at the called user side; (the call control entity of the network enters the "call received" state); [0059] or [0060] send a CONNECT message to its peer entity to indicate that the call has been accepted at the called user side; (the call control entity of the network enters the "connect request" state).

The call control entity of the network may insert bearer capability information element(s) in the CALL PROCEEDING message to select options presented by the mobile terminal in the bearer capability information element(s) (BC IEs) included in the SETUP message transmitted by the mobile terminal to the network. Upon receipt of the CALL PROCEEDING message, the call entity of the mobile terminal enters the "call initiated" state, stops the first timer (T303), and starts a second timer (T310). The ALERTING message is send by call control entity of the network to its peer entity at the mobile terminal, when the user alerting has been started at the called address. With receipt of the ALERTING message, the call control entity of the mobile terminal enters the "call delivered" state, stops the timers (T303 and T310), when running, and may output an altering indication to the user. The altering generation may be generated internally by the mobile terminal or the network may be responsible of the delivery of the altering indication. Upon receiving an indication that the call has been accepted, the call control entity of the network connects the traffic channel (including the connection of an interworking function, if required) and sends a CONNECT message to its peer entity at the calling mobile terminal. A third timer (T313) and the call control entity of the network enters the "connect indication" state. This CONNECT message indicates to the call control entity of the (calling) mobile terminal that a connection has been established through the network. The call control entity of the mobile terminal, upon receipt of a CONNECT message, attaches the user connection; returns a CONNECT ACKNOWLEDGE message; stops any locally generated alerting indication (if applied); stops timers (T303 and T310), if running; and enters the "active" state.

Now the call establishment procedure of a terminal originated call is completed and communications, especially voice communications, between the (calling) mobile terminal and the called address can commence.

Figure 2B:
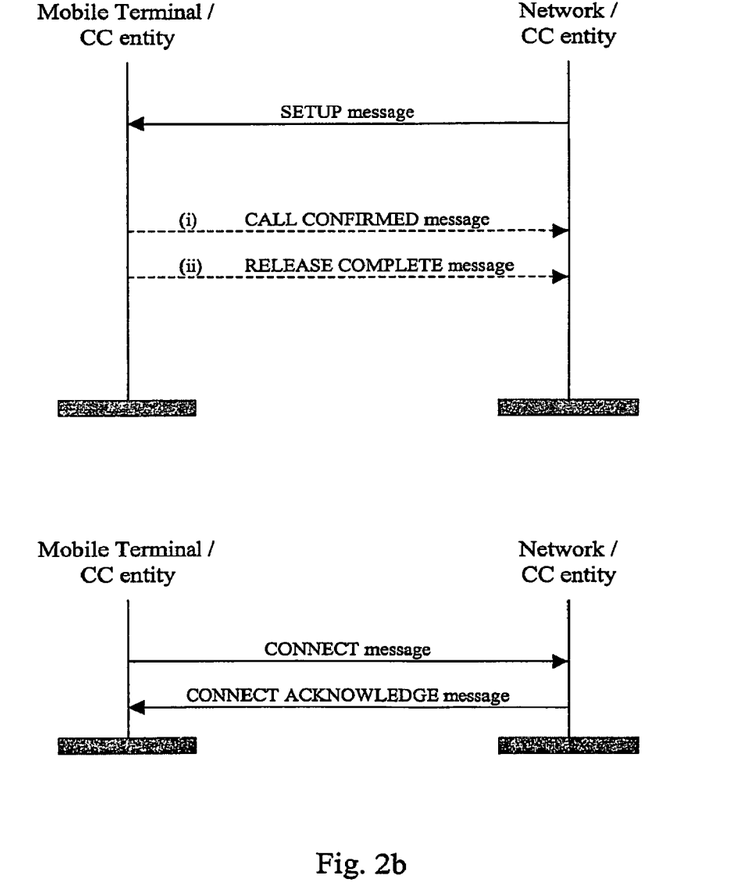
FIG. 2b shows a schematic sequence chart of a mobile terminating call establishment procedure.

With reference to FIG. 2b, a mobile terminating (MT) call establishment procedure is illustrated. Before the call establishment in accordance with a mobile terminating call can be initiated in the mobile terminal, the mobility management (MM) connection has to be established by the network. After the arrival of a call from a remote calling entity, the call control entity in the network initiates the mobility management (MM) connection establishment enters the "MM connection pending" state. Upon completion of the MM connection, the call control entity of the network sends a SETUP message to its peer entity at the mobile terminal, starts a first timer (T303), and enters the "call present" state. Upon receipt of a SETUP message, the mobile terminal performs compatibility checking. If the result of the compatibility checking is compatibility, the call control entity of the mobile terminal enters the "call present" state. An incompatible mobile terminal responds with a RELEASE COMPLETE message. If no response to the SETUP message is received by the call control entity of the network before the expiry of the first timer (T303), the cal failure procedures may be taken. The mobile terminal receiving a SETUP message performs compatibility checking before responding to that SETUP message. The compatibility checking is based on one or more bearer capability information elements included in the SETUP message. The basic structure of the bearer capability information elements and valid parameters and values thereof are described below with reference to FIG. 3.

Having entered the "call present" state, the call control entity of the mobile terminal acknowledges the SETUP message by a CALL CONFIRMED message, and enters the "mobile terminating call confirmed" state. The call control entity of the mobile terminal may include in the CALL CONFIRMED message to the network one or two bearer capability information elements to the network, either pre-selected in the mobile terminal or corresponding to a service dependent directory number. The mobile terminal may also include one or two bearer capabilities in the CALL CONFIRMED message to define the radio channel requirements. A busy mobile terminal which satisfies the compatibility requirements indicated in the SETUP message can respond either with a CALL CONFIRMED message if the call setup is allowed to continue or a RELEASE COMPLETE message if the call setup is not allowed to continue, both with cause "user busy". If the mobile user wishes to refuse the call, a RELEASE COMPLETE message shall be sent with the cause "call rejected". In the cases where the mobile terminal responds to a SETUP message with RELEASE COMPLETE message the mobile terminal releases the MM connection and enters an idle state after sending the RELEASE COMPLETE message. The call control entity of the network in the "call present" state, upon receipt of a CALL CONFIRMED message, stops the first timer (T303), starts a second timer (T310), and enters the "mobile terminating call confirmed" state. The call control entity of the mobile terminal having entered the "mobile terminating call confirmed" state, if the call is accepted at the called user side, the mobile terminal proceeds with the call establishment. Otherwise, if the signal information element was present in the SETUP message user alerting is initiated at the mobile terminal side; if the signal information element was not present in the SETUP message, user alerting is initiated when an appropriate channel is available. Here, initiation of user alerting means the generation of an appropriate tone or indication at the mobile terminal; and sending of an ALERTING message by the call control entity of the mobile terminal to its peer entity in the network and entering the "call received" state. The call control entity of the network in the "mobile terminated call confirmed" state, upon receipt of an ALERTING message, sends a corresponding ALERTING indication to the calling entity; stops the second timer (T310); starts a third timer (T301), and enters the "call received" state. In the "mobile terminating call confirmed" state or the "call received" state, if the user of a mobile terminal is user determined "User Busy" then a DISCONNECT message shall be sent with cause "user busy". In the "mobile terminating call confirmed" state, if the user of a mobile terminal wishes to reject the call then a DISCONNECT message is sent with cause "call rejected". In the "mobile terminating call confirmed" state or the "call received" state, the call control entity in the mobile terminal indicates acceptance of a mobile terminating call by sending a CONNECT message to its peer entity at the network; starting a fourth timer (T313); and entering the "connect request" state. In the "mobile terminated call confirmed" state or in the "call received" state, the call control entity of the network, upon receipt of a CONNECT message, through connects the traffic channel (including the connection of an interworking function, if required), stops the second, first or third timers (T310, T303 or T301) (if running); sends a CONNECT ACKNOWLEDGE message to its peer entity at the called mobile terminal; initiates procedures to send a CONNECT message towards the calling entity and enters the "active" state. In the "connect request" state, the call control entity of the mobile terminal, upon receipt of a CONNECT ACKNOWLEDGE message: stops the fourth timer (T313) and enters the "active" state. When the fourth timer (T313) expires prior to the receipt of a CONNECT ACKNOWLEDGE message, the mobile terminal initiates a call clearing procedure.

Now the call establishment procedure of a terminal originated call is completed and communications, especially voice communications, between the (calling) mobile terminal and the called address can commence.

In general, the purpose of the bearer capability information element (BC-IE) is to request a particular bearer service to be provided by the network. This indication is carried by certain connection control messages which may be categorized into those messages, which are related to the call establishment procedures and which are used during the established connection. During the call establishment procedure the public land mobile network (PLMN) bearer capability information element (BC IE) is included in:

the SETUP message, which is generated by the requesting entity (i.e. either the mobile terminal or the mobile services switching center (MSC)) to establish a mobile originating or mobile terminating call, respectively, and in the CALL CONFIRMED or CALL PROCEEDING messages, respectively, which are generated by the responding entity (i.e. either the mobile terminal or mobile switching center) in order to negotiate certain parameter values. If no bearer capability information element (BC IE) is included in the SETUP message, the CALL CONFIRMED message indicates the complete applicable bearer capability information element (BC IE). Normally, the network may release the call if it does not support the service indicated by the bearer capability information element (BC IE).

Also, if the service does not match with the service requested from the fixed network terminal the mobile services switching center (MSC)/interworking function (IWF) may release the call. (In the latter case also the fixed network terminal may release the call.)

During the established connection the public land mobile network (PLMN) bearer capability information element (BC IE) is included in the MODIFY, MODIFY COMPLETE, and MODIFY REJECT messages in order to change the service (bearer capability) or to change the maximum number of traffic channels and/or wanted air interface user rate when a non-transparent multislot data service is in use.

Figure 3:
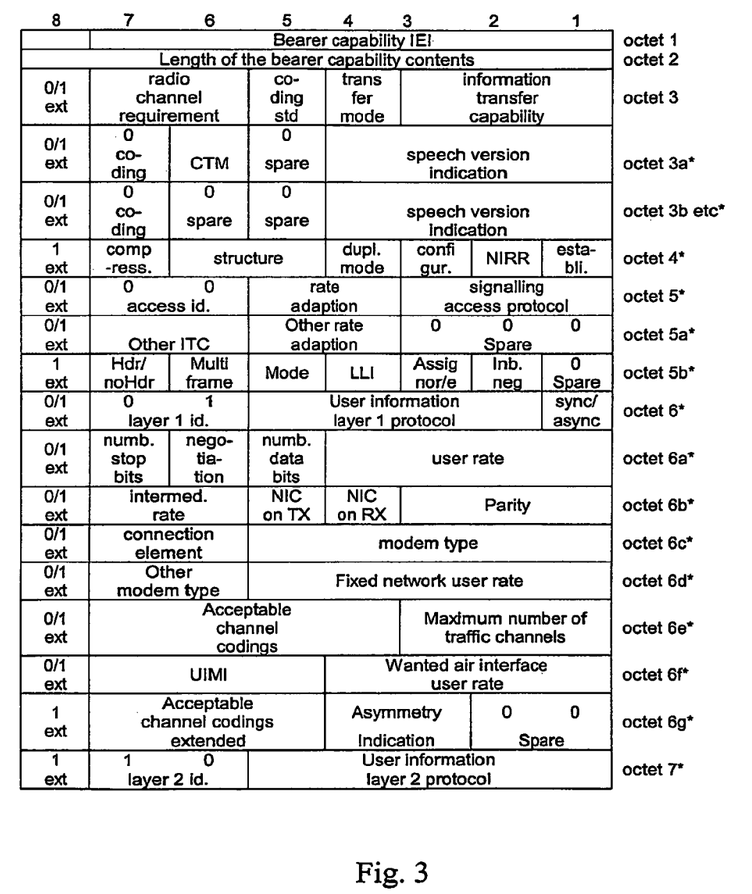
FIG. 3 shows schematically the basic structure of a bearer capability information element.

With reference to FIG. 3 the general structure of the public land mobile network (PLMN bearer capability information element (BC IE) is illustrated. Some of the shown octets are optional, some are only available or optional, if the parameter "Information Transfer Capability" does not indicate "Speech"; and some are only available if EDGE is used. A detailed description is available from the technical specification 3GPP TS 27.001 V3.15.0 (2004-06): "Technical Specification Group Core Network; General on Terminal Adaptation Functions (TAF) for Mobile Stations (MS) (Release 1999)", which should be enclosed herewith.

With respect to the individual parameter settings at the mobile terminal the following cases may be distinguished between the mobile originating call establishment and the mobile terminating call establishment.

The following table illustrates parameters relevant for the mobile originating call set up by a mobile terminal, i.e. bearer capability parameters included in the SETUP message communicated to the network. A parameter may indicate a field value of one of the following types:

"requested value" indicating a request which cannot be changed by the responding entity;

"offered value" indicating a proposal which may be changed by the responding entity;

a particular choice value leaving it up to the responding entity which value ultimately applies;

"as requested" indicating that the requested value applies and is confirmed (by returning it);

"selected value" indicating that a particular value applies either out of the offered set or as a free choice out of the defined set of values; and "supported value" indicating a value supported by the responding entity.

TABLE-US-00001

Message BC-parameter SETUP CALL PROC Number of Data
Bits (NDB) requested value as requested Parity Information
(NPB) requested value as requested Number of Stop Bits
(NSB) requested value as requested Connection Element (CE)
requested value (T/NT) as requested "both" with the selected
value preferred value indicated (T/NT) (e.g. both NT) User
Information Layer 2 requested value or NAV as requested TABLE-US-00001-continued Protocol (UIL2P) or NAV User Rate requested value as
requested Data Compression (DC) requested value as
requested or "NO" Fixed Network User Rate requested
value supported value (FNUR) Other Modem Type (MT)
requested value supported value User Initiated Modification
requested value supported value Indication (UIMI)

The following table illustrates parameters relevant for the mobile terminating call set up to a mobile terminal, i.e. bearer capability parameters included in the CALL CONFIRMED message communicated to the mobile terminal.

TABLE-US-00002

Message BC-parameter SETUP CALL CONF Number of Data
Bits (NDB) offered value selected value (free choice) Parity
Information (NPB) offered value selected value (free choice)
Number of Stop Bits (NSB) offered value selected value
(free choice) Connection Element (CE) requested value as
requested or (T/NT) selected value (T/NT) (free choice) "both"
with the selected value (T/NT) preferred value Indicated (e.g.
both NT) Sync/Asynchronous requested value as requested or
selected value Rats adaptation/Other rate requested value as
requested or adaptation selected value User Information Layer 2
offered value selected or NAV Protocol (UIL2P) or NAV User
Rate offered value selected value Data Compression (DC)
requested value as requested or "NO" Fixed Network User
Rate offered value selected value (FNUR) Other Modem Type
(MT) offered value selected value User Initiated Modification
offered value selected value Indication (UIMI)

The validity of a bearer capacity (BC) parameter value, either in the SETUP or CALL CONFIRMED message, may differ from A/Gb mode to GERAN (GSM/EDGE radio access network) Iu mode to UTRAN Iu mode. Certain parameters are irrelevant in UTRAN or GERAN Iu mode and any value given is valid and ignored. These parameters may be available in the bearer capability information element (BC IE). For those parameters that are relevant in UTRAN Iu mode, GERAN Iu mode and A/Gb mode, certain values may be invalid in one of the systems. Invalid parameter values may cause rejection of the bearer capability (BC) and subsequent release of the call. Parameters that are ignored in UTRAN or GERAN Iu mode may be set to default values, or to specific values in view of an eventual handover to A/Gb mode. Parameter values that are invalid in one system may result in unsuccessful handover from the other system. The following table shows lists of parameters that are ignored in UTRAN and parameter values which validity is different in A/Gb mode and UTRAN Iu mode.

TABLE-US-00003

Parameter/value GSM UMTS Radio Channel Requirements/
any valid ignored User rate/any valid ignored Intermediate
Rate/any valid ignored NIC on transmission/any valid ignored
NIC on reception/any valid ignored Negotiation of IR
requested/any valid ignored Acceptable Channel Codings/any
valid ignored Maximum number of traffic channels/any valid
Ignored User initiated modification indication/any valid Ignored
Asymmetry preference indication/any valid Ignored Modem type/
V.21, V.22, V.22bis, V.26ter valid Invalid V.32 valid invalid
for CE = T Fixed Network User Rate (FNUR)/ 32 kbit/s Invalid
valid for CE = NT 33.6 kbit/s Invalid valid 9.8, 14.4, 19.2, 38.4,
48.0 Valid invalid for CE = T 28.8 valid invalid for CE = T in
the case of ITC = UDI Other Rate adaptation/ PIAFS Invalid valid Those skilled in the art will appreciate the inventive concept on the basis of the teaching given above. Dual-mode mobile terminals exist, which are capable to operate with different network technologies as described above. In particular, dual-mode mobile terminals are operable with a 2.sup.nd generation PLMN, such as GSM, GSM with GPRS and/or GSM with EDGE enhancement, and a 3.sup.rd generation PLMN, especially WCDMA, UMTS and the like. Such dual-mode mobile terminals are allowed to inter-system handover between the 2.sup.nd generation network technology and the 3.sup.rd generation network technology. As described above, such inter-system handovers, also between system of differing technologies, are conventionally operated on the basis of network measurements, such as coverage, signal quality parameters (signal strength, signal error rate etc.), connection quality parameters (block error rate, etc.), load, service quality parameters and quality of service and the like. Although there is also possibility for service-based handover, where handover is done based on services supported only by one of the network, there exists currently no means (specification) defined for indication of the need for service-based handover. This means that service-based handovers are more like only a word without any actual implementation Currently the common way mobile terminals and networks operate is that they support multimedia telephony only in PLMNs operating 3.sup.rd generation technology, not in 2.sup.nd generation technology PLMNs. In accordance with the current specifications, mobile terminals may request multimedia calls only when operating in a 3.sup.rd generation PLMN. Moreover, based on the network measurements, the network may order a dual-mode mobile terminal to operate in 2.sup.nd generation technology PLMN at any time. If the user now wishes to do a multimedia video telephony call, there exists up to now no way for the mobile terminal to request such a multimedia call. In fact, dual-mode mobile terminal can not do anything else, except notifying the user that the desired multimedia call can not be done.

Figure 4A:
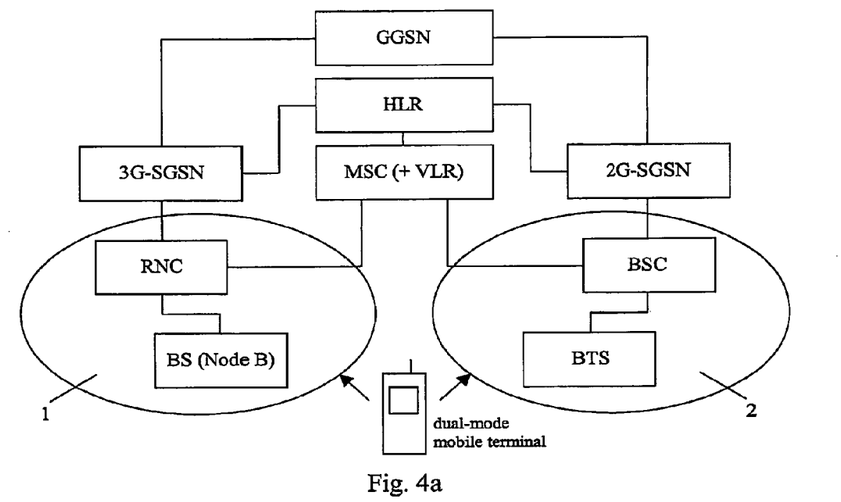
FIG. 4a shows a first communication system, which includes a 2.sup.nd generation technology public land mobile network and a 3.sup.rd generation technology public land mobile network and which enables the operation of a dual-mode mobile terminal, according to a first embodiment of the present invention.

With reference to FIG. 4a a communications system according to a first embodiment of the present invention is illustrated, which includes a 3.sup.rd generation technology PLMN and a 2.sup.nd generation technology PLMN, in particular a UTRAN 1 (Universal Mobile Telecommunication Services Terrestrial Radio Access Network) employing WCDMA (wideband code division multiple access) and a GSM (Global System for Mobile communication) radio access network 2. The UTRAN 1 includes a Base Station (BS) which is connected to a Radio Network Controller (RNC). The Radio Network Controller (RNC) of the UTRAN 1 is in turn connected to a home location register (HLR) and the mobile services switching center (MSC). The GSM radio access network (RAN) includes a base station (BTS), which is connected to a base station controller (BSC). The base station controller (BSC) of the GSM RAN 2 is in turn connected to the home location register (HLR), to the mobile services switching center (MSC). Further network entities such as the visited location register (VLR), interworking function (IWF), serving GPRS support node (SGSN), gateway GPRS support node (GGSN) belong to the core network of the communication system. The core network servers for switching communications in-between the PLMN, to other PLMNs, to external communication networks such as telephony networks and data networks (packet switched networks, Internet).

The illustrated communication system includes also a dual-mode mobile terminal, which supports GSM as well as WCDMA network technology for wireless communication. The dual-mode mobile terminal is operable with either the UTRAN or the GSM RAN for communication services. It shall be assumed that the dual-mode mobile terminal is currently operating in the GSM RAN, which embodies a 2.sup.nd generation technology network. Video telephony calls, which represent a specific class of multimedia calls, are requested with call control (CC) level messages, described above in detail with reference to FIGS. 2a and 2b. Nevertheless, multimedia telephony calls and especially video telephony calls usually require a mobile terminal operating in a 3.sup.rd generation technology network supporting multimedia telephony services; i.e. here the UTRAN.

Figure 4B:
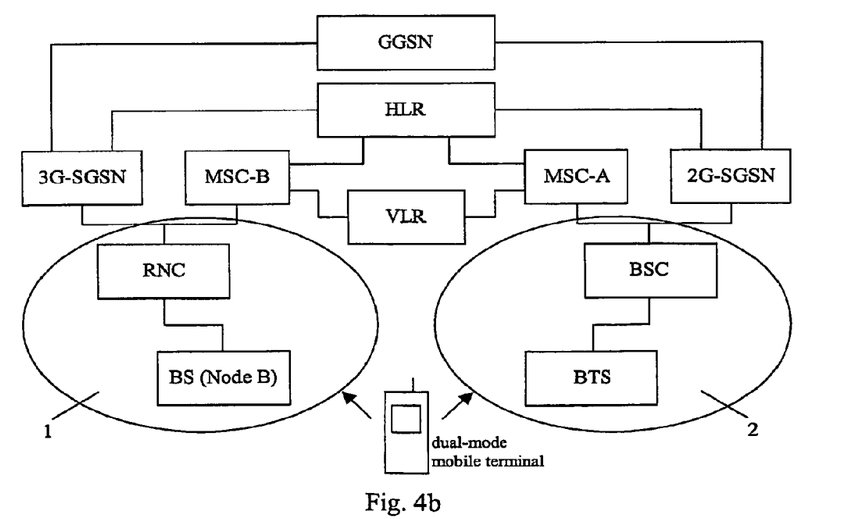
FIG. 4b shows a second communication system, which includes a 2.sup.nd generation technology public land mobile network and a 3.sup.rd generation technology public land mobile network and which enables the operation of a dual-mode mobile terminal, according to a second embodiment of the present invention.

With reference to FIG. 4b a communications system according to a second embodiment of the present invention is illustrated, which includes a 3.sup.rd generation technology PLMN and a 2.sup.nd generation technology PLMN, in particular a UTRAN 1 (UMTS universal mobile telecommunication services terrestrial radio access network) employing WCDMA (wideband code division multiple access) and a GSM (Global System for Mobile communication) radio access network 2. The first and second embodiments of communication systems illustrated in FIGS. 4a and 4b differ merely slightly. In particular, the second embodiment includes in contrast to the first embodiment different mobile services switching centers MSC-A and MSC-B associated with the GSM RAN 1 and the UTRAN 2, respectively.

Figure 5A:
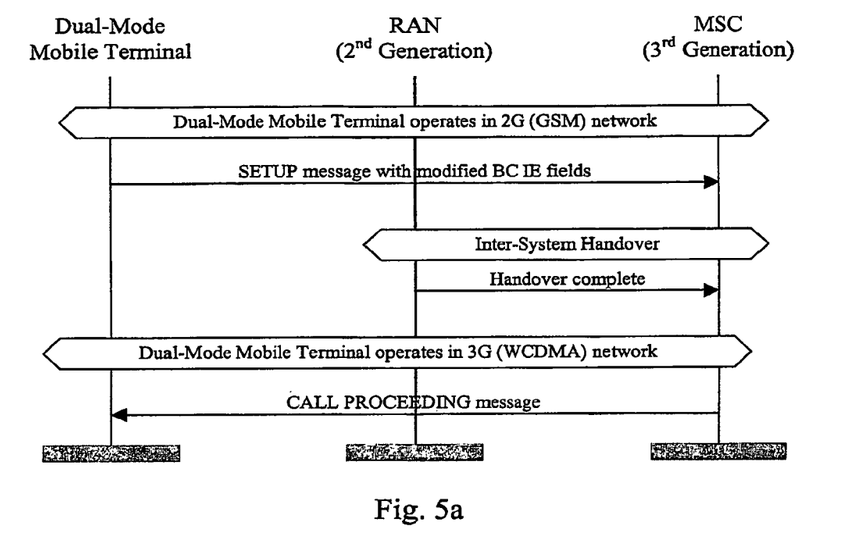
FIG. 5a shows a schematic sequence chart of a mobile originating call establishment procedure with mobile originating service-based inter-system handover initiation according to an embodiment of the present invention.
Figure 5B:
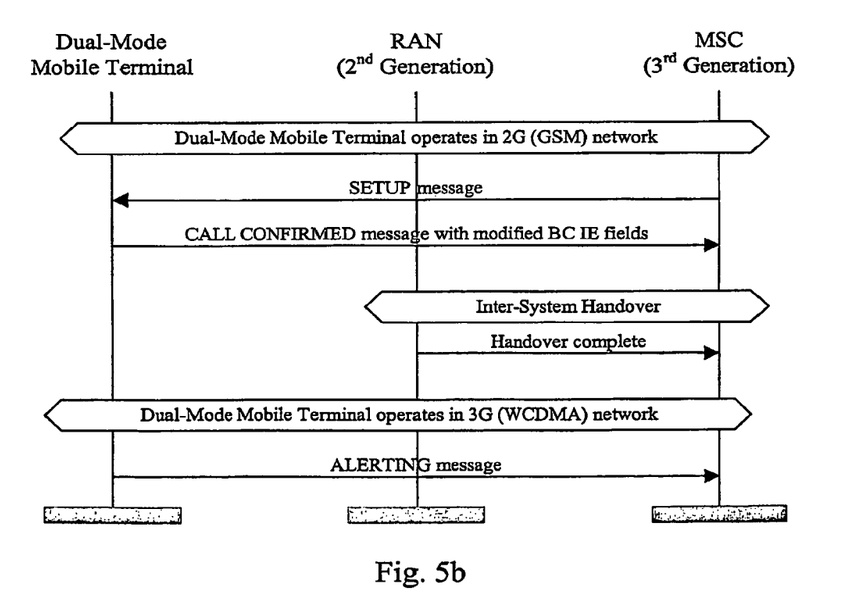
FIG. 5b shows a schematic sequence chart of a mobile terminating call establishment procedure with mobile originating service-based inter-system handover initiation according to an embodiment of the present invention.

With reference to FIGS. 5a and 5b, the inventive concept will be described in accordance with the mobile originating call establishment procedure as well as the mobile terminating call establishment procedure.

In case of a mobile originating video (multimedia) telephony call as illustrated in FIG. 5a, the mobile terminal requests the call with SETUP message. As described above, the SETUP message contains one or more bearer capability information elements (BC IEs), which indicates the bearer requirements for the call to be established. Before coding and sending of the SETUP message, the current subscription of the mobile terminal is checked to determine whether the mobile terminal is currently subscribed to either the GSM RAN (or GERAN BSS) or the UTRAN. Here, the dual-mode mobile terminal operates in the GSM RAN (or GERAN BSS). Consequently, the desired video (multimedia) telephony call may not be allowed, but may be enabled after an inter-system handover of the dual-mode mobile terminal to the UTRAN. Consequently, the SETUP message to be transmitted is encoded with an indication that the required bearer service(s) is/are not available.

With reference back to FIG. 3 and the description thereto, the skilled persons are thought that validity of a bearer capacity (BC) parameter value, in the SETUP message, may differ from (GSM RAN, GERAN BSS) A/Gb mode to UTRAN Iu mode; i.e. there exists 2.sup.nd generation specific fields and 3.sup.rd generation specific fields. To inform the network i.e. the call control entity of the network, about the lacking support for the requested multimedia call, one or more 2.sup.nd generation specific bearer capability fields, for instance the channel coding fields, may be set to "not acceptable". The parameter value "not acceptable" may be coded in accordance with a numeral or binary representation, i.e. in particular, the parameter value "not acceptable" may be coded as numeral, decimal and binary "0", respectively. It should be noted that any other representation is likewise applicable. Alternatively, there exists 2.sup.nd generation specific fields and 3.sup.rd generation specific fields having differing valid parameter values, such as the fixed network user rate (FNUR), where the rate value 33.6 kbit/s is a valid value as the dual mode mobile terminal is subscribed to a WCDMA (UMTS) PLMN. Moreover, the fixed network user rate (FNUR) may contain also another date rate value, which is not applicable with the 2.sup.nd generation technology network but applicable with the 3.sup.rd generation technology network, to which the handover is intended. In UMTS, the video telephony call is operable at a 64 kBits/s transparent data communication connection.

The network, i.e. the call control entity thereof, which may be implemented in MSC, receives the SETUP message, which contains one or more bearer capability information elements (BC IEs) with one or more bearer capability fields values modified in the manner as described above. This means, the one or more channel coding fields may contain "not acceptable" (value "0") and/or the FNUR field may contain a rate parameter value not applicable with GSM RAN mode (e.g. 33.6 kbit/s, 64 kbit/s etc.).

The call control entity of the network analyses the one or more received bearer capability information elements (BC IEs) and detects the modifications. This detection indicates to the call control entity of the network that the dual-mode mobile terminals requests for a service, here the video (multimedia) telephony call, which is not supported by the access network, in which the dual-mode mobile terminal is currently subscribed. Hence, the network initiates an inter-system handover of the dual-mode mobile terminal. Such inter-system handover procedures are described above with reference to FIGS. 1a and 1b. After completion of the inter-system handover, the dual-mode mobile terminal is now operating in the 3.sup.rd generation PLMN (WCDMA, UMTS), which supports the requested communication service, here the multimedia (video) telephony service. Thus, the call establishment procedure can be continued with a CALL PROCEEDING message sent by the call control (CC) entity of the network to the call control entity of the dual-mode mobile terminal. The call establishment procedure follows now substantially the call setup procedure described above with reference to FIG. 2a.

In case of a mobile terminating video (multimedia) telephony call as illustrated in FIG. 5b, the call control entity of the network, in which the mobile terminal is currently subscribed, notifies also the call control entity of the mobile terminal of an incoming call with a SETUP message. This SETUP message indicates to the mobile terminal that the calling entity wishes to establish a multimedia call. The mobile terminal answers to this SETUP message with CALL CONFIRMED message, which also contains one or more bearer capability information elements (BC IEs) defining information about the capabilities of the mobile terminal for this multimedia call. With reference to the conventional case, the CALL CONFIRMED message should contain a rejection indication due to the lacking support of the video (multimedia) telephony call requested by the SETUP message. In contrast to the conventional case, the CALL CONFIRMED message, which contains one or more bearer capability information elements (BC IEs) to inform the network about the bearer capabilities of the mobile terminal, includes bearer capability fields with parameter value modified in the way as described above. This means, the call control (CC) entity of the mobile terminal encodes a bearer capability information element (BC IE) with one or more 2nd generation specific bearer capability fields, for instance the channel coding fields, set to "not acceptable" (or any representation thereof such as value "0"). Alternatively, the call control (CC) entity encodes one or more 2.sup.nd generation specific fields with a parameter value only applicable as the mobile terminal operates in a 3rd generation technology network, such as the fixed network user rate (FNUR), where the rate value 33.6 kbit/s (or 64 kbit/s or any other applicable value) is a valid field parameter value as the dual mode mobile terminal is operating in a WCDMA (UMTS) PLMN. This CALL CONFIRMED message containing the one or more bearer capability information elements (BC IEs) with one or more bearer capability fields values modified in the manner as described above is sent by the call control (CC) entity of the mobile terminal to the peer call control (CC) entity of the network.

The network, i.e. the call control entity thereof, which may be implemented in MSC, receives the CALL CONFIRMED message, which contains one or more bearer capability information elements (BC IEs) with one or more bearer capability fields values modified in the manner as described above. This means, the one or more channel coding fields may contain "not acceptable" and/or the FNUR field may contain a rate parameter value not applicable with GSM RAN mode (e.g. 33.6 kbit/s, 64 kbit/s etc.).

The call control (CC) entity of the network analyses the one or more received bearer capability information elements (BC IEs) and detects the modifications. This detection indicates to the call control (CC) entity of the network that the dual-mode mobile terminals requests to establish a service, here the video (multimedia) telephony call, which is not supported by the access network, in which the dual-mode mobile terminal is currently subscribed. Hence, the network initiates an inter-system handover of the dual-mode mobile terminal. Such inter-system handover procedures are described above with reference to FIGS. 1a and 1b. In particular, the MSC informs the GERAN BSS, in which the mobile terminal is currently subscribed about the handover to the UTRAN After completion of the inter-system handover, the dual-mode mobile terminal is now operating in the 3.sup.rd generation PLMN (WCDMA, UMTS), which supports the requested communication service, here the multimedia (video) telephony service. Thus, the call establishment procedure can be continued with an ALERTING message sent by the call control (CC) entity of the mobile terminal to the call control entity of the network and the calling entity, respectively. The call establishment procedure follows now substantially the call setup procedure described above with reference to FIG. 2b.

In principle, the inventive concept is based on the fact that the bearer capability information element has differing fields and or differing field parameter values applicable with 2.sup.nd generation technology networks and 3.sup.rd generation technology networks. For example, there are no channel codings in 3.sup.rd generation technology systems, such as WCDMA and UMTS, so channel coding fields are valid only for 2.sup.nd generation technology systems, such as GSM. In the same way, some parameter value of fields may be applicable for one system only, for example, data rate 33.6 (64 kbit/s) in fixed network user rate (FNUR) field is applicable only for 3.sup.rd generation technology systems.

The inventive concept includes several advantages. There are no new messages or information elements needed in signalling between mobile terminal and the network and its entities to enable the (service-base terminal originating) inter-system handover indication to the network. The interoperability with mobile terminals supporting older standard specifications and network entities and components supporting older standard specifications is not compromised such that operability of those terminals, entities, and components is guaranteed. The only reasonable way for a network entity/component being realised on the basis of an older standard is to handle situations where no channel codings are supported, which results in a disconnection of the call. Form user side, this is a similar behaviour compared to the behaviour of the mobile terminal, which does not implement the functionality presented here. The communication from the Mobile Services Switching Center (MSC) to the mobile terminal is substantially not affected; i.e. the mobile terminating SETUP message remains actually exactly the same, as channel codings are not filled in the SETUP message sent in this (downlink) direction to the mobile terminal.

Those skilled in the art will appreciate that the term RAN is used in its general understanding which may differ from that of the standard description. The conjunction with a 2.sup.nd generation technology network and especially a GSM network, the radio access network (RAN) thereof may also be understood as GERAN BSS (Base Station Subsystem). To specify a 3.sup.rd generation radio access network, the term UTRAN is used in the description.

It should be noted that the CALL PROCEEDING message (shown in FIG. 5a) may be also sent to the mobile terminal before the inter-system handover for the mobile terminal is initiated.

It should be also noted that the communication network receives this mobile originating service-based indication for inter-system handover (either coded in the SETUP message in case of mobile originating call establishment or coded in the CALL CONFIRMED message in case of mobile terminating call establishment) via the radio access network, to which the mobile terminal is currently connected, and in case this radio access network does not employ the requested radio access technology, the communication network checks whether the terminal can be handed over to a cell using the requested technology. The final decision is thus taken by the communication network and depends in addition on other related factors of which the mobile terminal has no knowledge, like the network configuration and the current load situation. If it is possible, the communication network will hand the mobile terminal over to a cell using the preferred radio access technology. Thus, the communication network is able to allocate a cell using the best suited radio access technology as early as possible. Afterwards, the communication network maintains the provided knowledge about the preferred radio access technology in order to enable the mobile terminal to use this technology for the duration of the connection.

It should be noted that the above teaching with reference to FIGS. 5a and 5b is applicable in a communication system illustrated in FIG. 4a, which may be distinguished by a mobile services switching center (MSC) associated with both the core network of the 2.sup.nd generation technology network system as well as the 3.sup.rd generation technology network system. Alternatively to a common MSC, different MSC may be operable with the respective network system. Such an embodiment is illustrated in FIG. 5b, where a first MSC-A is associated with the GSM RAN 1 (i.e. the 2.sup.nd generation technology network) and the UTRAN 2 (i.e. 3.sup.rd generation technology network), respectively. The handling and signalling relating to the inter-system handover is in principle out of the scope of the present invention, but a brief teaching about possible signalling for inter-MSC handover should be given.

To make this solution according to the present invention also applicable for signalling between core network (CN) and radio access network (RAN) and in case of an required inter-MSC handover, a signalling similar to the signalling described above may be applied at A-interface base station subsystem application port (BSSAP) signalling. The A-interface is a signalling interface between Mobile Services Switching Center (MSC) and Base Station Controller (USC). This means in case of multimedia or video telephony call (requiring a 64 kbit/s transparent data rate communication connection between access network and mobile terminal), the MSC should be able to set the allowed radio interface data rate values in the Channel Type Information Element (CT IE) of an Assignment Request message. In particular, the octet 5a of the Channel Type Information Element to values 0, in particular together with indication that service handover to UMTS should be performed by Base Station Controller (BSC). The same BSSAP signalling as used at the A-interface may be applicable also with the E-interface, which represents the interface the MSC-A and the MSC-B in inter-MSC inter-system handovers. During such inter-MSC inter-system handovers, the Channel Type ED (CT IE) of the BSSAP is sent from MSC-A to MSC-B. MSC-B will have to create the Radio Access Network Application Port (RANAP) Radio Access Bearer (RAB) parameters that are used at In interface towards the Radio Network Controller (RNC). In particular to enable this, the MSC-B will have to get at least a Channel Type indicating FNUR 64 kbit/s, which corresponds to the requiring a 64 kbit/s transparent data rate communication connection for video telephony calls.

In addition, when indicating the allowed radio interface data rate values as 0 in Channel Type Information Element (CT IE), the MSC-B would also know that it's not possible to make a subsequent inter-system handover back to GSM for a once established connection after above described handover, since the mobile station does not support this service (radio interface data rate 0 kbit/s) in GSM mode.

While there have shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and or method steps which perform substantially the same function in substantially the same way to achieve the same results are within the scope of the invention. Moreover, it should be recognized that structures and or elements and or method steps shown and or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. A method of initiating a service based inter-system handover by a mobile terminal comprising:
    accessing a communication network via a radio access network of a first type by the mobile terminal, the communication network comprises at least said radio access network of the first type and a radio access network of a second type;
    transmitting by the mobile terminal information including at least one field indicating that a requested service is operable only with the radio access network of said second type, wherein the at least one field comprises an inapplicable parameter value for the radio access network of said first type and the at least one field is ignored by the radio access network of said second type;
    initiating the service based inter-system handover from the radio access network of the first type to the radio network access network of the second type in response to the information transmitted by the mobile terminal,
    wherein the information transmitted by the mobile terminal prevents the radio access network of the first type from determining a configuration to prevent the service based inter-system handover.

2. The method of claim 1, wherein the at least one field is a bearer capability field.

3. The method of claim 1, wherein the mobile terminal information includes at least one other field indicating that a requested service is operable only with the radio access network of the first type.

4. The method of claim 3, wherein the requested service is allowed only after inter-system handover from the radio access network of the first type to the radio network access network of the second type.

5. The method of claim 2, wherein the information includes at least one bearer capability information element including all channel coding fields being set to "not acceptable".

6. The method of claim 2, wherein the mobile terminal is notified of the requested service by a core network via one of the radio access network of one of the first type and the radio access network of one of the second type.

7. A method of initiation of an inter-system handover by a mobile terminal, the mobile terminal accessing a communication network that comprises at least a radio access network of a first type and a radio access network of a second type,
    wherein said mobile terminal is capable of operating in at least said radio networks of said first type and said second type, comprising:
    receiving from said mobile terminal information including at least one field indicating that the mobile terminal is not capable to sufficiently operate a requested service in the radio access network of only said first type, wherein the at least one field comprises an inapplicable parameter value for the radio access network of said first type and the at least one field is ignored by the radio access network of said second type; and
    initiating at a network entity of said communication network said inter-system handover of said mobile terminal from the radio access network of the first type to the radio network access network of the second type in response to the receiving from said mobile terminal information including the at least one field indicating that the mobile terminal is not capable to sufficiently operate the requested service in the radio access network of only the first type,
    wherein the information transmitted by the mobile terminal prevents the radio access network of the first type from determining a configuration to prevent the service based inter-system handover.

8. A network entity configured to trigger a service-based inter-system handover within a communication network, of which the network entity is a part, wherein said service-based inter-system handover is initiated by a mobile terminal operable with at least a radio access network of a first type and a radio access network of a second type forming said communication network, the network entity comprising an interface and a triggering entity,  wherein via the triggering entity the network entity triggers the service based inter-system handover to said radio access network of the second type in response to a transmission received via the interface from said mobile terminal accessing said communication network via the radio access network of the first type,  wherein said transmission includes information including at least one field, which indicates that a requested service is operable only with said radio access network of said second type, wherein the at least one field comprises an inapplicable parameter value for the radio access network of said first type and the at least one field is ignored by the radio access network of said second type,  wherein the information transmitted by the mobile terminal prevents the radio access network of the first type from determining a configuration to prevent the service based inter-system handover.

9. A mobile terminal enabled for initiation of an inter-system handover, the mobile terminal accessing a communication network comprising at least a radio access network of a first type and a radio access network of a second type, comprising:

a call control entity; and a radio frequency interface for communication with the communication network  wherein the call control entity of the mobile terminal is configured to:

operate in at least said radio networks of the first type and the second type, and   initiate the inter-system handover of from the radio access network of the first type to the radio network access network of the second type in response to transmitting information including at least one field indicating that the mobile terminal is not capable to sufficiently operate a requested service in said radio access network of only said first type,  wherein the at least one field set by the call control entity comprises an inapplicable parameter value for the radio access network of said first type and the at least one field is ignored by the radio access network of said second type,  wherein the information transmitted by the mobile terminal prevents the radio access network of the first type from determining a configuration to prevent the service based inter-system handover.

10. A mobile terminal enabled for initiation a service-based inter-system handover, the mobile terminal accessing a communication network comprising at least a radio access network of a first type and a radio access network of a second type, comprising:

a call control entity; and a radio frequency interface for communication with the communication network  wherein said mobile terminal operates in at least said radio networks of said first type and said second type, the call control entity of the mobile terminal is configured to initiate said service-based inter-system handover from the radio access network of the first type to the radio network access network of the second type by transmitting information including at least one field,  wherein the information set by the call control entity serves to indicate that a requested service is operable only with said radio access network of said second type, wherein the at least one field comprises an inapplicable parameter value for the radio access network of said first type and the at least one field is ignored by the radio access network of said second type,  wherein the information transmitted by the mobile terminal prevents the radio access network of the first type from determining a configuration to prevent the service based inter-system handover.

\* \* \* \* \*